Aug. 28, 1956     C. F. WALZ     2,760,223
DOOR STOP
Filed June 22, 1954     2 Sheets—Sheet 1
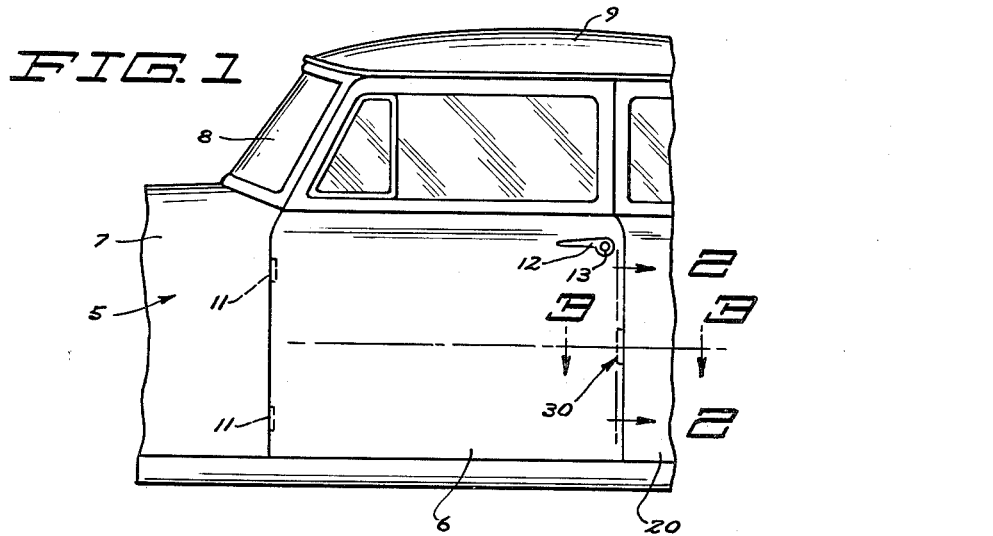
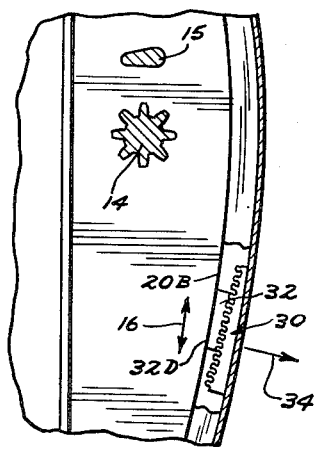
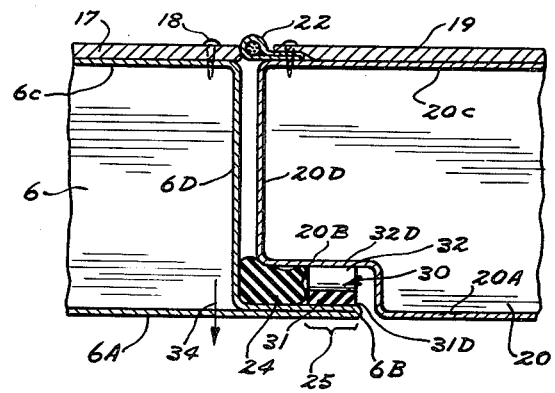
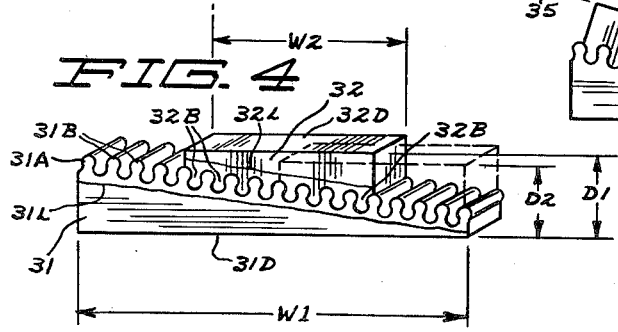
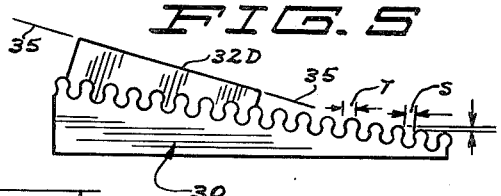
INVENTOR.
CARL F. WALZ
BY Paul, Moore & Lugger
ATTORNEYS.

Aug. 28, 1956                C. F. WALZ                    2,760,223
                              DOOR STOP
Filed June 22, 1954                                 2 Sheets-Sheet 2
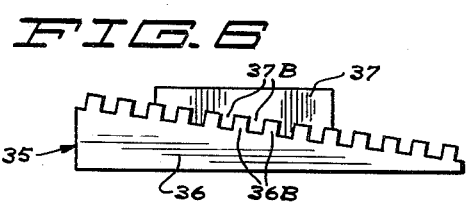
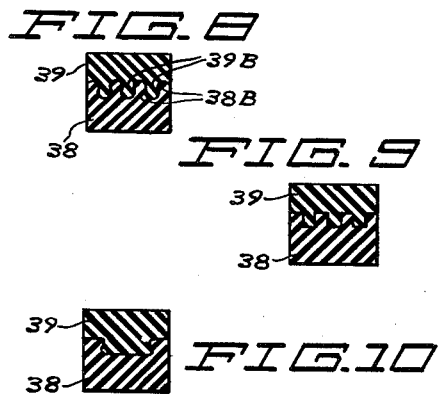
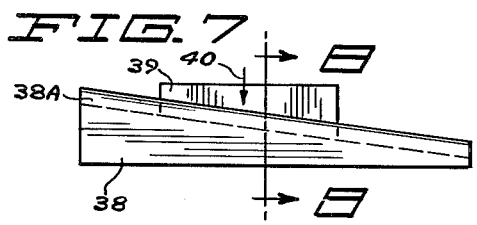
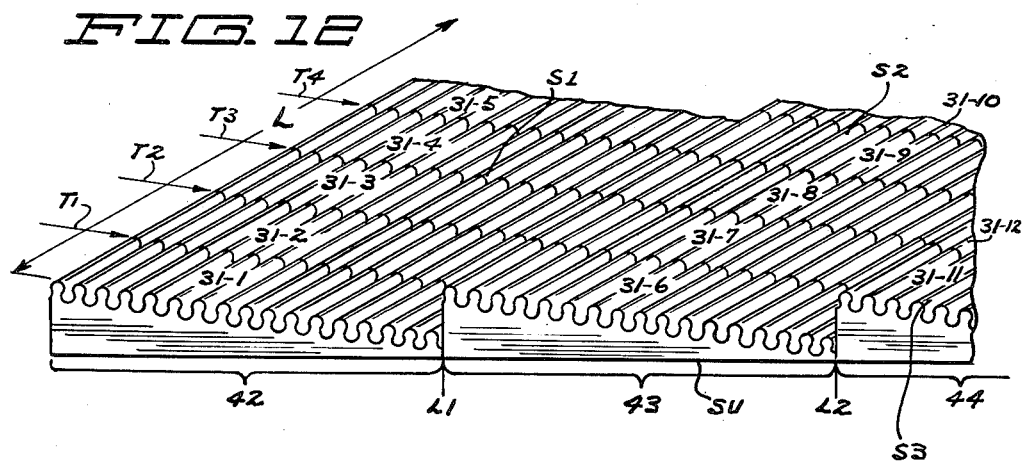
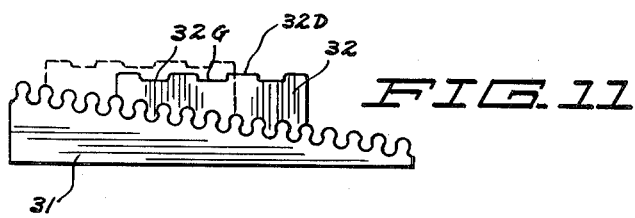
INVENTOR.
CARL F. WALZ
BY
ATTORNEYS

United States Patent Office 2,760,223
Patented Aug. 28, 1956

2,760,223

DOOR STOP

Carl F. Walz, Minneapolis, Minn., assignor to Durkee-Atwood Company, a corporation of Minnesota Application June 22, 1954, Serial No. 438,387

12 Claims. (Cl. 16—86)

This invention relates to an adjustable stop for doors or the like and more particularly to adjustable compressible stop assemblies having particular application in the doors of automotive equipment such as automobile or truck bodies. It is a well known occurrence among the motoring public that the doors of automobiles, trucks and the like very frequently develop rattles. The modern automotive vehicle body is usually constructed of sheet steel stamping on a steel framing, and so as to be normally considered as quite rigid. Nevertheless, such construction permits a certain degree of flexibility and as a result the doors, which are normally swung on a pair of hinges for each door, have components of motion up and down and in and out with reference to the latch and positioning jambs on the doors. When the automotive equipment is new, the latches and jambs are set up comparatively snug and the door will remain comparatively quiet due to the fact that around the periphery of the door there is customarily provided a strip of sponge rubber which has for its primary purpose the sealing of the door against the car body. The sponge rubber provides a certain amount of resilient support in addition to its sealing effect and holds the door resiliently outwardly against the retaining influence of the latch and hence prevents "rattling" of the door. However, after a comparativly short time, sponge rubber will settle and will become permanently deformed or "set" and as a consequence, while such sponge rubber still may be sufficient to provide reasonably good sealing of the door against the entrance of drafts of air and dust, it still will not be sufficiently resilient and tight to prevent rattling. As a result, after an automobile or truck is a few months old, rattles customarily develop in the door and the latches must be set up tighter so as to increase the pressure against the spong rubber strip, which meanwhile has permanently deformed. This adjustment is continued, as rattles develop, until the sponge rubber strip is entirely pressed down. Many owners of automotive equipment are incapable of making the necessary adjustments to the latches and hence this service must be performed by a professional mechanic at considerable expense to the owner. Even then, the professional mechanic is frequently unable to provide a lasting adjustment which will keep the doors relatively free from rattles and as a consequence many automobiles and trucks are driven with rattling doors because the owners simply give up hope of ever keeping the doors entirely free from rattles.

It is an object of this invention to provide an adjustable stop of resilient character for doors such as the doors of automotive equipment. It is a further object of the invention to provide an inexpensive and yet highly effective device which can be applied by the owner or at least by inexperienced help to the doors of automotive equipment and the like for keeping them rattle-free. It is another object of the invention to provide an inexpensive device for keeping the doors of movable equipment free from rattles. It is a further object of the invention to provide an inexpensive resilient device which may be easily adjusted by the owner who will thus be able to do his own "road testing" and such adjusting is thereby may be shown to be necessary, for keeping the rattles out of the doors of owner operated automotive equipment.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which—

Figure 1 is a fragmentary side elevational view of the body of automotive equipment showing one door in side elevation.

Figure 2 is an enlarged fragmentary sectional view taken along the lines and in the direction of arrows 2—2 of Figure 1.

Figure 3 is an enlarged fragmentary horizontal sectional view taken along the lines and in the direction of arrows 3—3 of Figure 1.

Figure 4 is an isometric view of the adjustable stop of the present invention.

Figure 5 is a side elevational view of the adjustable stop of the present invention showing the stop moved to a second position and condition.

Figure 6 is a side elevational view that corresponds to that shown in Figure 4 but which shows a slightly modified form of the invention.

Figure 7 is a side elevational view corresponding to those shown in Figures 4 and 6 but showing another slightly modified form of the invention.

Figure 8 is a sectional view taken along the lines in the direction of arrows 8—8 of Figure 7.

Figures 9 and 10 are sectional views corresponding to that shown in Figure 8 but showing slightly modified shapes of interlocking members for attaching the tube parts of the apparatus together.

Figure 11 is an isometric view showing one step in the method of manufacture of the adjustable stops to the present invention.

Figure 12 is a side elevational view corresponding to that shown in Figures 4 and 6 but illustarting a further slightly modified form of the invention.

Throughout the drawings corresponding numerals refer to the same parts.

Referring to Figure 1, there is illustrated an automotive body 5 having a front left door 6, a hood 7, a windshield 8, and top 9. The body shown is representative of a common form of automobile. The front left door as illustrated is hung on hinges 11—11 and the door is operated by the customary handle 12 having a push button or lever release handle 13. This form of door is merely illustrative. Other hinging structures and door handles may obviously be used.

In the usual automotive door construction there is provided a rotary or other form of latch such as that shown at 14 in Figure 2 and a steadying device 15 which serves to hold the door against undue vertical movement such as illustrated by the double arrow 16. There are many forms of door latches 14 and many forms of steadying devices used in the automotive body industry. The door construction is further illustrated in Figure 3 which shows the outer panel of the door 6A having an edge flange 6B. The door has an inner portion 6C and an edge wall 6D. On the inside of the door there is a decorative door panel 17 which is usually held in place by screws or other fastening devices 18.

The jamb against which the door swings in the automotive vehicle is illustrated at 20 and has an outer surface 20A, which may be the outer panel of the automotive vehicle body, a recessed surface 20B, inner wall 20C, and connecting wall 20D. An inner decorative panel is shown at 19. There is also usually provided an edge roll 22 which finishes around the inside of the door and also acts as a barrier against the entrance of air and dust which pass the door seal strip.

While the construction of the doors of automotive vehicles may vary considerably, there is usually provided a compressible strip 24, which is generally made of sponge rubber and is cemented to the inside of the door flange 6B in a position such that it can bear against the recessed surface 20B and thus seal the door. Almost invariably there is an edge area denoted by the bracket 25 along the flange outside of the space occupied by the compressible strip of sponge rubber 24. It is in this area 25 that the adjustable stop of the present invention can conveniently be placed. If the flange 6B is so narrow that the compressible strip 24 of sponge rubber occupies most of the width of the flange, then the positioning of the adjustable stop of the present invention is made by cutting away enough of the sponge rubber sealing strip to accommodate the adjustable stop.

The adjustable stop of the present invention is shown generally at 30 and is illustrated in detail in the remaining figures. As shown in Figures 1, 2 and 3, the adjustable stop is illustrated as being positioned along the outer side of the sponge rubber strip 24 and as being cemented to the free edge of flange 6B in the area 25. However, it will be understood that where the total width of flange 6B is equally or nearly equally to the width of the sponge rubber strip 24, then the stop would be placed against the flange in alignment with the length of the sponge rubber strip which is cut away for a distance sufficient to allow a clear space to receive the stop.

The adjustable stop of the present invention comprises two portions. The first of these is element 31 which is cemented to the door flange and the second is an adjustable piece 32 that attaches to element 31. Both of the elements 31 and 32 are generally in the form of wedges and they are fitted with interlocking teeth along the wedging surfaces so that element 32 may be positioned at any desired place along the slanting surface 31A of element 31. Both of the elements 31 and 32 are composed of resilient material such as rubber composition. The interlocking teeth at 31B and 32B are likewise composed of the same or similar resilient rubber composition. In respect to each of the elements 31 and 32, the teeth and the body of the element are a unitary molding, but it is within the purview of the invention to use a slightly stiffer composition for the teeth than the body. The teeth of each element can be resiliently deflected sufficiently so that they can be brought into interlocking relationship thereby to hold the teeth 32B (of element 32) in any selected position along the teeth 31B of element 31. If desired the teeth 31B and 32B may be coated with a rubber lubricant so as to facilitate the working of the teeth together for interlocking them. Or, if desired, the user may slightly moisten the teeth with saliva or water and by working them slightly against each other the teeth 31B and 32B can be brought into interlocking relation as shown in Figure 4. In this way the user may position the element 32 as shown in full lines to achieve a total vertical dimension of D1 or the element 32 may be positioned at another place along the slanting surface 31A of the element 31 and thus achieve a total vertical dimension D2. The vertical dimensions D1 and D2 thus are the "effective thickness" of the adjustable stop and the user can accordingly adjust this vertical dimension readily without expert knowledge or experience by interlocking the teeth of element 32 at any desired place along the interlocking teeth of element 32 for taking the rattles out of the door. The user can road test the automotive equipment and make such adjustment as needed.

For installing the device in the automobile, the under surface 31D is preferably provided with an adhesive which can be the type which is ordinarily dry and such that it can be activated by a solvent such as gasolene. A pressure sensitive adhesive may also be used in which case the adhesive surface is covered by a sheet of cambric or plastic until it is ready to be stripped away to expose the adhesive. To use the device the owner need only obtain a set of the elements 31 and 32 and clean off the flange 6B of the door to which element 31 is to be applied. If it is necessary to cut away a short length of the sponge rubber strip 24, this is done, or in some instances the sponge rubber strip may just be notched so as to allow the element 31 to be received on the flange 6B. In any event, after preparing a suitable space on the flange 6B, the adhesive surface 31D is activated by moistening it with gasolene or lighter fluid or similar activating solvents; or where a pressure sensitive adhesive is used at 31D, it is exposed. Then the user simply places the adhesive surface of element 31 against the flange 6B with the adhesive bearing against the flange. The user can, if he desires, place the element 31 in interlocking engagement with the element 32 at a middle position before adhesively securing the surface 31D to the flange. Then when the assembly is cemented to the flange the door is closed and left closed for awhile so as to allow the adhesive to set. The user then drives the automotive equipment and if the door still rattles the element 32 is readjusted to another position higher on the slanting surface 31A of element 31 so as to increase the dimension D2 to the dimension D1 or even more. This will achieve a quiet condition of the door in almost all instances. It may be noted that by effecting a proper adjustment of the stop 30 the surface 32D of the member 32 is brought solidly into contact with the surface 20B of the door jamb and this causes the entire assembly 30 to be compressed since it is composed of resilient rubber composition. The compressed stop therefore exerts an outward pushing force in the direction of the arrow 34, Figs. 2 and 3, and prevents the door from rattling. The compressive force between the surface 32D of the member 32 of the stop and the surface 20B also produces a strong frictional resistance against movement of the door in the direction of the double arrow 16 and thus prevents the steadying device 15 from clattering against its stop on the jamb. Much rattling of doors is due to the poor adjustment of the member 15 against its cooperating receiver on the jamb. The adjustable resilient stop of the present invention helps to relieve the door of rattles produced by such maladjustment.

As will be noted from Figure 1, the entire stop device 30 is mounted at an elevation generally between the elevations of the hinges 11—11 on the opposite side of the door. This positioning of the stop 30 is the preferred position. Obviously, if desired, several of the stops 30 may be placed along the flange 6B of the door to provide additional steadying of the door for best results.

In conditions of severe maladjustment of the door where the door is sprung outwardly, greater height than available by positioning of the member 32 at the thickest end of the member 31 may be achieved by simply reversing the member 32 with reference to the member 31. This reversal of position as shown in Figure 5 produces a slanting down of the surface 32D as indicated by the slanting line 35—35, but since the entire assembly 30 will compress due to its natural resiliency a considerable portion of the surface 32D will be brought into engagement with the jamb. Thus extreme conditions may be accommodated with some facility by suitable use of the adjustable stop of the present invention.

In the preferred embodiment shown in Figures 4 and 5, the interlocking teeth 31B and 32B are slightly thicker at their points of maximum cross-section as illustrated by the dimension T than the minimum dimension of the spaces between the teeth as illustrated by the dimension S. Thus, in a preferred form the difference in the dimensions T and S is approximately five thousandths of an inch. This slight difference in dimension produces a firm, interlocking effect between the cooperating resilient teeth.

By way of further illustration but without limitation upon the invention, it may be mentioned that a preferred commercial embodiment of the invention was composed of a rubber composition having a low compression set and composed of cold weather stock and having a durometer number of from 30 to 70. The lower durometer composition produces a lower holding force whereas the higher durometer number stock is relatively hard, strong stock.

As a modification of the invention, the assembly composed of the members 31 and 32 may each, if desired, be composed of two resilient compositions of different degrees of resiliency. Thus, the teeth 31B and the teeth 32B may be composed of relatively harder rubber such as a low compression, cold weather stock having a durometer reading of 70, whereas the back portion (below the line of the teeth in member 30, and above the line of the teeth in member 32, as shown in Figure 4) may be composed of a low compression set, cold weather stock, rubber composition having a durometer reading of 30. Thus below the irregular line 31L of the member 30 the stock may be somewhat softer, while the teeth 31B and their interconnecting portions above the line 31L may be made of somewhat harder stock. Similarly, in the block 32, the teeth and their interconnecting portions below the line 32L may be of somewhat harder stock than the portion of the block 32 which is above the line 32L. The reason for this is to provide somewhat stiffer composition along the interconnecting teeth while at the same time providing a relatively more resilient composition for the main body of the two members 31 and 32.

In Figure 6, the composite structure at 35 consists of the two blocks 36 and 37, similar in general outline to the two blocks 31 and 32 and similarly constructed except for the shape of the interlocking teeth. In this instance, the interlocking teeth 36B and the cooperating interlocking teeth 37B are square cut. In many instances it is unnecessary to provide other than a simple interlocking of square cut teeth in order to provide adequate retention of the block 37 on the block 36. In this connection, the teeth 37B—37B may be made slightly wider than the spaces between the teeth 36B—36B and vice versa, so that there is a sideways compression of tooth against tooth when the two blocks 36 and 27 are brought into engagement as shown in Figure 6. Thus the teeth 36B might for example be two thousandths of an inch wider than the spaces between the teeth 36B.

In Figure 7 the adjustable interlocking teeth are run lengthwise of the slanting surface 38A of the two blocks 38 and 39. The slant of the surface 38A is so slight that even though a strong compressive force is applied in the direction of arrow 40, the block 39 will not slide on the block 38, particularly when the teeth of block 39 are interlocked with the teeth of block 38. The teeth of the two blocks 38 and 39 may be of diverse patterns such as shown in Figures 8, 9 and 10. Thus, in Figure 8 the teeth 38B of the block 38 and the teeth 39B of the block 39 are of a pattern similar to those run crosswise of the corresponding blocks in Figures 4 and 5. Or the teeth may be square cut as shown in Figure 9, or a single wide tooth structure may be provided as shown in Figure 10. The object in every instance is to provide a sufficient interlocking merely to hold the block 39 on the block 38, the particular pattern of the teeth being capable of some variation.

In Figure 11, there is illustrated a further modification of the invention, wherein the block 32, of Figure 4, is identical with that shown in Figure 4, except that its upper surface 32D is provided with transverse corrugations as at 32G. Such corrugations add to the resiliency of the composite structure and may be used in any of the modified forms of the invention illustrated.

In Figure 12 there is illustrated a mode of manufacture of the adjustable stops of the present invention. In the manufacturing there is provided a mold, not illustrated, having a surface corresponding to the reverse of the upper surface of a plurality of strips of adjustable stops, nested together. Thus, in Figure 12, there are provided side-by-side a plurality of wedge shaped portions shown above the brackets 42, 43 and 44, a portion of the strip at 44 being shown. Each of the strips 42, 43, 44 (and as many more as may be molded at the same time) has a width equal to the dimension W1 of the element 31, or W2 of element 32, Figure 4, or the corresponding dimension of other forms of the under block. Then, a long length is molded corresponding to the dimension L, Figure 12, which may be as long as the equipment available for the molding operation. All of the side-by-side strips are molded together as one wide sheet. The mold has a suitable surface so as to form the tooth corrugations. The mold will form the general area of the surface S1 on a slant corresponding to the slant of 31A of Figure 4, and the surface S2 will be likewise formed with the same slant as will the surface S3 and any other surfaces that are molded side by side. The entire composite which is molded in one piece will thus be as though a plurality of the blocks 31 were placed together as indicated by the numerals 31–1 through 31–5 along the surface S1, 31–6 through 31–10 along the surface S2, and 31–11 and 31–12 along the surface S3. The under surface of the composite is one smooth plane SU. After the entire molding is complete, and while it is together as one integral unit, it is turned over and the smooth under surface SU which is common to all of the strips 42, 43 and 44 and as many more as may be molded together, is then coated with the adhesive in a solvent, which when dried will form the adhesive surface 31D, Figure 4. The entire piece is then permitted to stand until the under surface SU as thus coated with adhesive is thoroughly dry. Then, the various strips 42, 43, and 44 are cut apart as along the lines L1, L2 and along any other lines joining the surfaces S1, S2, S3, etc. This then produces a plurality of separated strips 42, 43, and 44 which are then cut transversely along the lines T1, T2, T3, T4, etc., so as to separate the strips into individual wedge shaped pieces corresponding to the wedge 31. The blocks 32 are similarly molded and slitted and cut but the surface 32D of the block is not coated with an adhesive. If desired, the tooth corrugations may be coated with a rubber lubricant such as a silicone lubricant, while the entire molding is in a unitary piece as shown in Figure 12, and before the individual components are slit apart.

While the member 31 of the resilient stop has been illustrated as secured in place adhesively against the flange 6B of the door, it will be readily appreciated that other modes of securing may be provided if desired. Many other modes of attachment will occur from the foregoing suggestions. Rubber compositions have been mentioned as the preferred form, it will be understood that other resilient compositions suitable to the service to which they are exposed may be utilized. Synthetic rubber and natural rubber compositions are preferred for most automotive uses.

As many apparently widely different embodiments of this invention may be made without departing from the spirit and scope thereof, it is to be understood that I do not limit myself to the specific embodiments herein.

What I claim:

1. An adjustable door stop comprising a pair of resilient generally wedge shaped members each having an inclined face adapted to be laid against the inclined face of the other, the inclined faces of said members being formed with cooperating interlocking protuberances for holding said members against movement in the direction of said inclined faces relative to each other, and the protuberances being sufficiently resilient and shaped to be resiliently deformed when interengaged for holding them together.

2. The stop of claim 1 further characterized in that said protuberances are in the form of interlocking teeth extending transversely across the inclined faces of said members, said teeth being formed so that the teeth on one member interlock between the teeth on the other member.

3. The stop of claim 2 further characterized in that said interlocking teeth are rounded and the outer surfaces of said teeth have a transverse dimension slightly greater than the space between adjacent teeth.

4. A door stop comprising a first member in the general form of a wedge having one surface of the wedge formed for attachment to a door jamb, the other face of said wedge forming a surface which is inclined to the door jamb when said first member is in place on said door jamb, a second member substantially shorter in length than the first member, said second member having an inclined face adapted to seat cooperatively against the inclined face of the first member, said cooperating inclined faces being formed with resilient interlocking teeth which are shaped so that during engagement of the teeth of said members said teeth are resiliently deformed for holding said members assembled together with their cooperating inclined faces in engagement, said members as a whole being resilient in a direction transversely though the assembled members.

5. The stop of claim 4 further characterized in that the interlocking teeth of the members are smoothly rounded and have a maximum thickness in the transverse direction slightly greater than the distance between adjacent teeth.

6. The stop of claim 5 further characterized in that said teeth extend generally transversely across the inclined faces.

7. The stop of claim 4 further characterized in that said teeth are formed so as to be of generally rectangular cross section.

8. The stop of claim 4 further characterized in that said cooperating teeth are composed of a slightly stiffer resilient composition than the remainder of each of said members.

9. The stop of claim 4 further characterized in that said cooperating teeth extend in the direction of said inclined faces.

10. The stop of claim 4 further characterized in that the surface of said first member which is adapted for engagement against door jamb is provided with an adhesive coating for adhesively adhering it to the door jamb when the assembly is applied to said door jamb.

11. The stop of claim 10 further characterized in that said adhesive coating is of the type that is normally dry and is capable of being rendered sticky by being moistened by a solvent.

12. The stop of claim 10 further characterized in that said adhesive coating is a pressure sensitive coating.

References Cited in the file of this patent

UNITED STATES PATENTS

| 1,385,448 | Harward | July 26, 1921 |
| 1,422,579 | Kent | July 11, 1922 |
| 1,556,593 | Eklind et al. | Oct. 13, 1925 |
| 1,972,503 | Walker | Sept. 4, 1934 |
| 2,146,090 | O'Rourke | Feb. 7, 1939 |
| 2,585,438 | Clingman | Feb. 12, 1952 |